US007305324B2

(12) United States Patent
Beshears et al.

(10) Patent No.: US 7,305,324 B2
(45) Date of Patent: Dec. 4, 2007

(54) SYSTEM AND METHOD FOR IDENTIFYING, VALIDATING, WEIGHING AND CHARACTERIZING MOVING OR STATIONARY VEHICLES AND CARGO

(75) Inventors: David L. Beshears, Knoxville, TN (US); Stephen G. Batsell, Oak Ridge, TN (US); Robert K. Abercrombie, Knoxville, TN (US); Matthew B. Scudiere, Oak Ridge, TN (US); Clifford P. White, Seymour, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 367 days.

(21) Appl. No.: 10/998,305

(22) Filed: Nov. 24, 2004

(65) Prior Publication Data

US 2006/0111868 A1   May 25, 2006

(51) Int. Cl.
    *G01G 7/00*  (2006.01)
(52) U.S. Cl. .................................................... 702/173
(58) Field of Classification Search ................. 702/173
    See application file for complete search history.

(56) References Cited

U.S. PATENT DOCUMENTS

| 5,050,090 A | * | 9/1991 | Golub et al. ................ 700/217 |
| 5,646,376 A | | 7/1997 | Kroll |
| 5,894,112 A | | 4/1999 | Kroll |
| 6,459,050 B1 | | 10/2002 | Muhs et al. |
| 7,104,453 B1 | * | 9/2006 | Zhu et al. ............... 235/462.14 |
| 2002/0049520 A1 | * | 4/2002 | Mays ........................... 701/19 |
| 2004/0021579 A1 | * | 2/2004 | Oursler et al. ......... 340/870.07 |

OTHER PUBLICATIONS

Mississippi Valley State University Computational Sciences and Engineering Division, Weigh In Motion (WIM) With Rational Rose, Aug. 8, 2003, Department of Energy Research Alliance for Minorities (RAM) Program.*

Coats, Julius, "Weigh-in-Motion Technology for Military Operations", TR News, No. 231, Mar.-Apr. 2004, pp. 16-18.

* cited by examiner

*Primary Examiner*—John Barlow
*Assistant Examiner*—Aditya Bhat
(74) *Attorney, Agent, or Firm*—Kirk A. Wilson (57) ABSTRACT

An asset identification and information infrastructure management (AI3M) device having an automated identification technology system (AIT), a Transportation Coordinators' Automated Information for Movements System II (TC-AIMS II), a weigh-in-motion system (WIM-II), and an Automated Air Load Planning system (AALPS) all in electronic communication for measuring and calculating actual asset characteristics, either statically or in-motion, and further calculating an actual load plan.

19 Claims, 5 Drawing Sheets

```
        ┌─ 11          ┌─ 12              13 ─┐      14 ─┐
MSL ID  01Nov2002      TDC D1            UIC UCPHAA
DMOD S                 Destination       POE 1H9    POD PH1

Bumper
Sel    TCN      HPOE   Number    Description         Weight      Cube AUCPHAA00D00010XX    1   8598    LANDING CRAFT MECH   160360.00   21738
   AUCPHAA00D00020XX    1   8591    LANDING CRAFT MECH   238500.00   21738
   AUCPHAA00D00030XX    1   8582    LANDING CRAFT MECH   153579.00   21739
   AUCPHAA00D00040XX    1   8592    LANDING CRAFT MECH   153579.00   21738
   AUCPHAA00D00050XX    1   8580    LANDING CRAFT MECH   175705.00   21738
   AUCPHAA00D00060XX    1   557231T STLR FLATBED 34-TON   17390.00    2885
   AUCPHAA00D00070XX    1   492-8   TRUCK VAN EXP 5-TON   27823.00    3323
   AUCPHAA00D00080XX    1   492-6T  TRAILER CARGO 1-1/2 T  2440.00     782
   AUCPHAA00D00090XX    1   492-31  TQG POWER PACK         9585.00     906
   AUCPHAA00D00100XX    1   557119T STLR FLATBED 34-TON   17390.00    2885
   AUCPHAA00D00110XX    1   557-420 CRANE WHEL MTD R/T   104100.00    7229
Enterd'X'otolselect or Space to deselect
```

```
                                  ┌─ 11       ┌─ 12         ┌─ 13        ┌─ 14
----------------------------------│-----------│-------------│------------│-----------
MSL ID  01Nov2002                 │  TDC D1   │             │UIC UCPMAA  │
                                  │           │             │            │
DMOD S                            │  Destination           POE 1M9      POD PE1
----------------------------------│-----------│-------------│------------│-----------
                                  │       Bumper           │            │
Sel      TCN             HPOE     │       Number   Description    Weight     Cube ▌  AWCPMAA00D00010XX      1       8598     LANDING CRAFT MECH    160360.00    21738
     AWCPMAA00D00020XX      1       8591     LANDING CRAFT MECH    238500.00    21738
     AWCPMAA00D00030XX      1       8582     LANDING CRAFT MECH    153579.00    21738
     AWCPMAA00D00040XX      1       8592     LANDING CRAFT MECH    153579.00    21738
     AWCPMAA00D00050XX      1       8580     LANDING CRAFT MECH    175705.00    21738
     AWCPMAA00D00060XX      1       557231T  STLR FLATBED 34-TON    17390.00     2885
     AWCPMAA00D00070XX      1       492-8    TRUCK VAN EXP 5-TON    27829.00     3323
     AWCPMAA00D00080XX      1       492-6T   TRAILER CARGO 1-1/2 T   2440.00      782
     AWCPMAA00D00090XX      1       492-31   TQG POWER PACK          9585.00      906
     AWCPMAA00D00100XX      1       557119T  STLR FLATBED 34-TON    17390.00     2885
     AWCPMAA00D00110XX      1       557-420  CRANE WHEEL MTD R/T   104100.00     7223
Enter 'X' to select or Space to deselect
```

| TCN | Description | NSN | Bump |
|---|---|---|---|
| AWEJGA0$0D00740> | SMALL EXT NODE SWTCH | 5805012459058 | A-230 |
| AWEJGA0$0D00750> | SMALL EXT NODE SWTCH | 5805012444257 | A-133 |
| AWEJGA0$0D00760> | SMALL EXT NODE SWTCH | 5805012444257 | A-132 |
| AWEJGA0$0D00770> | SMALL EXT NODE SWTCH | 5805012444257 | A-131 |
| AWEJOA0$0D00780> | SMALL EXT NODE SWTCH | 5805012444257 | A-231 |
| AWEJGA0$0D00790> | SMALL EXT NODE SWTCH | 5805012444257 | A-232 |
| AWEJGA0$0D00800> | SMALL EXT NODE SWTCH | 5805012444257 | A-233 |
| AWEJGA0$0D00820> | TRK UTIL CRG/TRP CARR | 2320011077155 | A-118 |
| AWEJGA0$0D00850> | TRK UTIL CRG/TRP CARR | 2320011077155 | A-206 |

☐ Select All

Select

● One Dimensional MSL
○ Two Dimensional MSL
○ One Dimensional Equipment Labe
○ Two Dimensional Equipment Labe
○ Pallet ID/Label

SYSTEM AND METHOD FOR IDENTIFYING, VALIDATING, WEIGHING AND CHARACTERIZING MOVING OR STATIONARY VEHICLES AND CARGO

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

CROSS REFERENCE TO RELATED APPLICATIONS

This application is related to U.S. Pat. No. 5,998,741 "System and method for accurately weighting and characterizing moving vehicles" issued Dec. 7, 1999, and U.S. Pat. No. 6,459,050 "Method and apparatus for converting static in-ground vehicle scales into weigh-in-motion systems", issued Oct. 1, 2002; all herein incorporated by reference.

BACKGROUND OF THE INVENTION

Weighing vehicles and other cargo before loading them onto aircraft in a theater of operations is critical to the deployment of U.S. military forces. Rolling stock and other cargo must be weighed and measured accurately to calculate the center of balance of each item for proper distribution of weight in the aircraft. The weighing and measuring of equipment and cargo are vital to the safety of the aircraft, the crew, and any passengers. Errors can be fatal. In-ground static scales and tape measures are used for weighing and determining center of balance and are available at most air bases in the United States, but not in remote or undeveloped areas.

Military procedure requires all equipment to be weighed before loading, without guesswork or estimates. Each location requires specifically recalculating weight and center of balance, and taking into account the effects of altitude, temperature, runway length, and aircraft type.

U.S. military forces today are deployed globally and rapidly, often in areas with little infrastructure, rarely including an in-ground static weigh scale. For wheeled vehicles, if an in-ground fixed weigh scale is not available, individual wheel-weigh manual portable scales and tape measures are used to weigh military equipment and to determine the center of balance. Individual wheel-weigh scales are placed under each wheel, and all wheels must be on the scales at the same time, to ensure accuracy.

After weighing the individual wheels or wheel sets, the next step is to measure the distance between the axles, calculate the center of balance, the individual axle weights, and the total vehicle weight. The Air Force loadmaster uses the center-of-balance data and total vehicle weight to plan a specific load for each aircraft.

The process is time-consuming, exhausting, and prone to error, especially under adverse weather conditions. Placing the individual wheel-weigh manual portable scales under the wheels of the vehicle also presents a safety hazard. The process requires 6 to 10 soldiers. The data acquired is used by the loadmaster to determine the loading of the aircraft. No Air Force pilot will take off (and should not) without clearance from the loadmaster, who is responsible for aircraft safety with respect to loading.

Currently, Army units use portable individual wheel weight or fixed in-ground static scales, tape measures, and calculators to determine vehicle axle weights, total vehicle and cargo weight and center of balance for vehicles and cargo to be transshipped via railcar, ship, or airlifted in support of military and humanitarian operations. The process of manually weighing and measuring all vehicles and cargo subject to these transshipment operations is time-consuming, labor-intensive, and most importantly is prone to human errors that can result in safety hazards and inaccurate data. The identification, weight and center of balance information on each piece of cargo and vehicle must be manually entered into logistics load planning systems introducing the high likelihood of human key-stroke error into the deployment preparation process. Incorrect information introduced into the Defense Transportation System (DTS) can negatively impact onward movement of cargo and vehicles in theater, needlessly delaying essential supplies and equipment to the end-user/soldier. The importance of having correct, timely information in the DTS for use by all services cannot be overstated. In austere areas of operations, scales may not be available at all, and the vehicle and cargo weight and center of balance must be estimated. This process is even more susceptible to human error. The lack of a standardized airlift-weighing system for joint service use also creates redundant weighing and manual data entry requirements at the cost of scarce resources and time.

The Army identifies the vehicles and manually enters the data into Transportation Coordinators' Automated Information for Movements System II (TC-AIMS II) and then manually calculates vehicle axle weights and balance data and manually records and transfers this data to Automated Air Load Planning System (AALPS) personnel who manually enter it into the AALPS system. Each of these steps in the process is prone to human error. By establishing automated data exchange links between (1) WIM-II and the vehicle RFID tags, and (2) WIM-II device and AALPS, vehicle ID and WIM-II data could be automatically transferred to AALPS, thus eliminating those human errors and at the same time expediting the process.

In the private sector, considerable effort has been made by the federal and state transportation agencies and motor carriers to increase the efficiency of enforcement operations at the highway weigh-stations. For example, operational tests and regional deployments such as Advantage I-75, Heavy Vehicle Electronic License Plate Program (HELP) Crescent project, Prepass and Commercial Vehicle Information Systems and Networks (CVISN) are making great strides towards improving the productivity of both enforcement officers and motor carriers at weigh stations. One of the significant technical advances that have helped lead to these improvements is the development of weigh-in-motion systems. In conjunction with other technologies, weigh-in-motion systems are used to screen out overweight commercial vehicles approaching the weigh stations. Unfortunately, a large majority of carriers are not participating in the programs such as Advantage I-75 and are still required to stop at the weigh-stations. Furthermore, although existing commercially available WIM systems can be use as screening devices they do not provide the accuracy required (<1%) for final certification and ticketing of overweight vehicles. There is considerable room for improvement in accuracy and variability in the commercial WIM systems.

At best, weight enforcement activities are slow and cumbersome causing substantial overcrowding at weigh stations. Law enforcement officials are forced to either create unsafe conditions by allowing vehicles to backup in long lines near the weigh station entrance ramps or allow carriers to bypass weigh stations completely. Each day several thousand carriers travel by various weigh stations. Approximately 70% of these vehicles bypass the weigh stations due to the overcrowded conditions. Traffic simulations of a low-speed WIM system indicate one can reduce the average delay for a motor carrier from 280 seconds to 40 seconds and eliminate vehicles bypassing the weigh station. The successful implementation of converting a static scale to a high-accuracy, low-speed weigh-in-motion system will allow weight enforcement officials to weigh all carriers thus increasing productivity and operational efficiency through increased throughput.

Conventional WIM systems used today are plagued with problems of accuracy. Mainline WIM systems have a typical accuracy error of greater than 5%. This fact limits their utility in enforcement and other applications because users often do not trust the measurements obtained.

It is an object of the present invention to provide a system and method for identifying, validating, weighing and characterizing moving or stationary vehicles and cargo with a weigh-in-motion (WIM) system that is more accurate than the prior art and that can be interfaced with a data management system for load planning, law enforcement, and cargo inspection in both military and commercial applications.

BRIEF SUMMARY OF THE INVENTION

Asset visibility is important in providing various commercial and military planning systems with accurate real world data on vehicles, equipment and cargo. The asset identification and information infrastructure management system of this invention, hereafter referred to as AI3M, integrates with Automated Identification (AIT), Transportation Coordinators' Automated Information for Movements System II (TC-AIMS II) and Global Transportation Network (GTN) systems and the improved weigh-in-motion system (WIM-II), via Automated Air Load Planning System (AALPS) to provide near real-time tracking and in-transit visibility. WIM-II provides a man-portable means of accurately determining axle weights and spacings, total vehicle weight and longitudinal center of gravity for vehicles and pallets as they pass over the WIM-II transducer at a speed of 3-10 mph. Because of the automated nature of WIM-II, it eliminates human errors due to time stresses, adverse weather conditions, and manual calculations and data entry.

WIM-II provides a system and method for accurately measuring the weight of individual tire(s), the speed profile of the vehicle, the individual axle weights, the distance between axles, and the lateral and the longitudinal center of balance of the vehicle. The information is required for military deployments to load and balance an aircraft prior to take-off. The characteristics are also useful to commercial vehicle law enforcement officers to quickly and accurately determine the individual axle weights for highway safety. Industry uses this invention to determine the tare weight on incoming vehicles and then determine the load weight as the vehicle exits the facility. The invention is used to quickly and accurately determine the weight of product delivered to a facility. The WIM-II system improves the weighing process by reducing personnel hours and the time required for deployment and by eliminating opportunities for human errors from the manual transfer of data or from the miscalculation of vehicle attributes.

DETAILED DESCRIPTION OF THE INVENTION

The asset identification and information infrastructure management system of this invention (AI3M) integrates with Automated Identification (AIT), Transportation Coordinators' Automated Information for Movements System II (TC-AIMS II), Global Transportation Network (GTN) systems and the improved weigh-in-motion system (WIM-II), via Automated Air Load Planning System (AALPS) to provide near real-time tracking and in-transit visibility.

The use of automatic identification technology (AIT) tools assists in streamlining operational procedures (business processes) and improve data accuracy. There are four basic components of AIT:

1) An automatic identification data storage device, (e.g., bar code label, optical memory card, Smart Card, or Radio Frequency (RFID) tag).
2) AIT hardware used to write/burn information onto the data storage devices and later, read/interrogate the data from the devices.
3) Automated information systems that can support the reception of data from AIT enabling tools.
4) A reliable communications infrastructure that links the AIT tools to the automated information systems and further links the automated information systems to global in-transit and total asset visibility systems.

As equipment flows through the force projection process, source data is captured at transportation nodes and in-transit points. The data capture is accomplished by scanning/interrogating the AIT data storage device attached to each piece of equipment.

Figure 5:
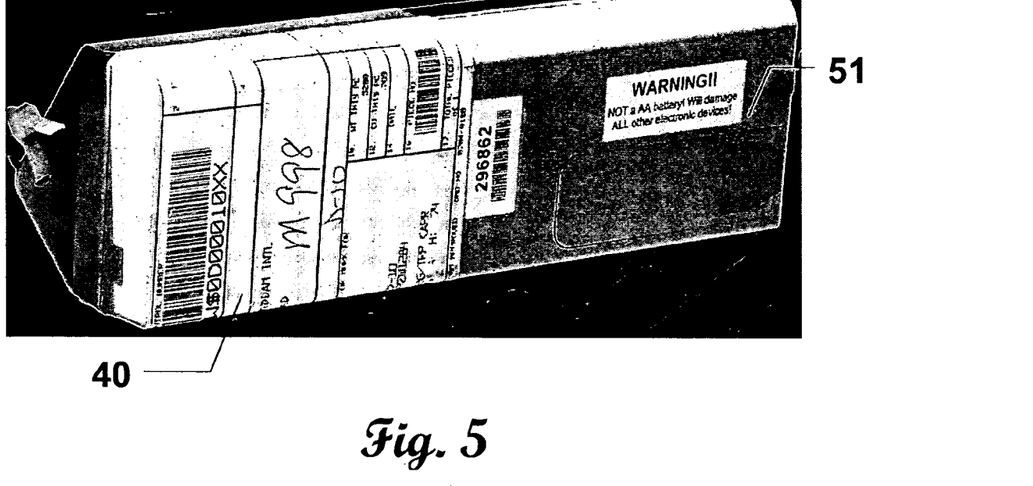
FIG. 5 is a photograph of a sample RFID with a military shipping label.
Figure 6:
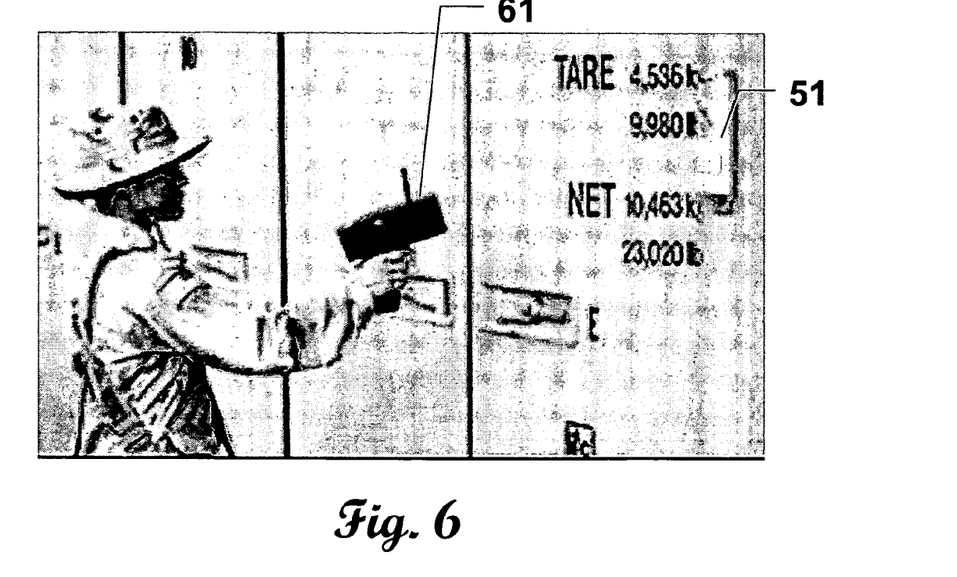
FIG. 6 is a photograph showing the PTC-AIMS-II mobile interrogator reading an RFID tag.

FIGS. 5 & 6 show an RFID tag 51 that uses a system of transponders, more commonly known as "tags" and interrogators. An interrogator 61 emits electronic signals that communicate with the tag 51, resulting in a visual or audible response answering its call. The interrogator 61 is capable of "reading" or "writing" to the tag 51, and may be a fixed or a portable handheld device. A system of interrogators and "active" tags, working in conjunction with the WIM-II, provides in-transit visibility—an accurate accounting of the location of assets.

RFID is used in a variety of applications today. The most common of which are listed as follows:
ISO container tracking
Vehicle tracking
Fleet management
Deployment support
Air pallet tracking and accountability
Repair parts tracking Warehouse management and inventory
Manufacturing production control
Sensitive items inventory/issue
Reusable container tracking
Ammunition tracking, receipt and inventory
Supply chain management
Cargo security
Cargo classification
Reparable parts tracking and financial credit verification
Personnel locating
Personnel access control
Baggage tracking
Marathon runner tracking/timing
Library book inventory/sign-out
Retail anti-theft
Industrial clothing cleaning plant control
Biometrics validation
MHE tracking
Medical equipment locating The invention can use active tags or passive tags. Active tags include a one or two-way radio transceiver; one-way for ID only (locator tags) and two-way for tags with data storage and/or interactive command sets [e.g. user defined tag database query]. These tags may, or may not have memory (erasable, programmable, or random access) for storage of user defined data, and they have a battery, which is used to send the data back to a reader. Depending on the type of tag, they may also have a CPU, and read only memory to store the tags firmware and allow the tag to respond to user commands (Savi tags have a CPU and ROM, as well as on-board, user defined memory). Active tags typically have far greater read range (up to 300 feet), and often are more omni directional in reader orientation (depending on operating frequency).

Passive tags (tags that use the energy from the interrogator to transmit the data back to the interrogator) are an emerging technology that can be integrated in the near future. Many commercial enterprises are beginning to embrace this technology and thus cargo that is shipped, may indeed have this technology embedded in it.

TC-AIMS II falls within the Department of Defense (DoD) mission area of mobility and transportation for DoD passengers and cargo during war and peace. Operating as part of the Global Combat Support System (GCSS), it provides critical data to the Global Transportation Network (GTN) and Command and Control (C2) systems. It interfaces with Joint and Service systems to provide In-transit Visibility (ITV) and Total Asset Visibility (TAV) to all Services.

Figure 1:
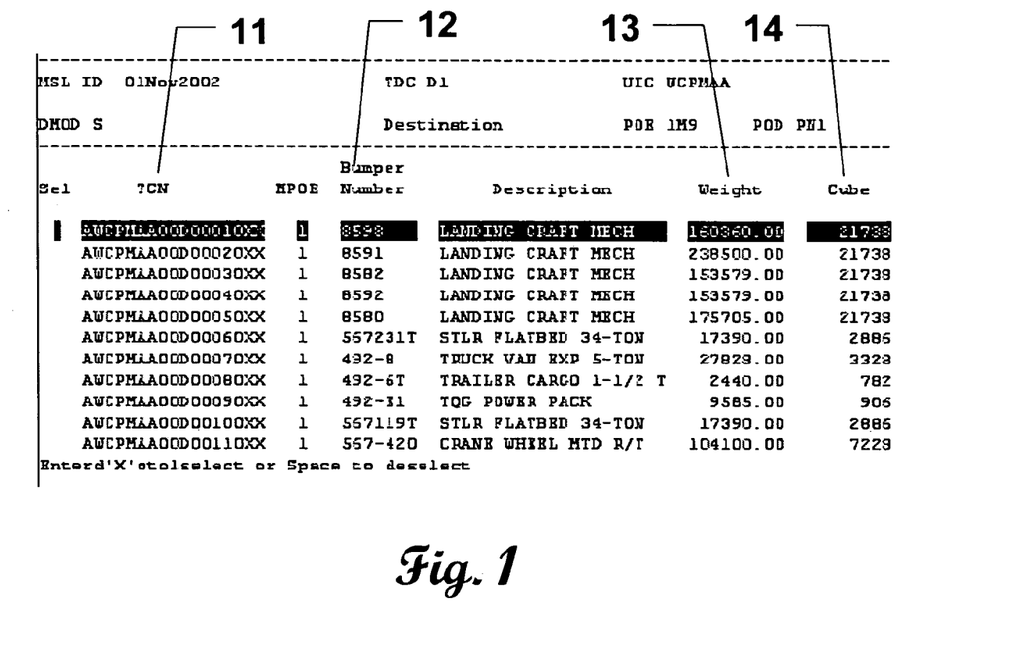
FIG. 1 is a screenshot of data of interest for TC-AIMS-II.

For references for weighing vehicles, containers, and pallets, information contained in TC-AIMS II and its predecessor Transportation Coordinators' Automated Command and Control Information System (TC-ACCIS) is the authoritative source for this data. FIG. 1 shows the critical data/information that identifies "what is to be weighed". The key into this data structure is the Transportation Control Number (TCN) 11. In some use cases, an easier data field that is also unique is the Bumper Number 12. The screen display from TC-AIMS II illustrates the crucial data fields. Also on interest is that the description is also displayed with the weight 13 and cube 14 of the specific TCN and Bumper Number.

Figure 2:
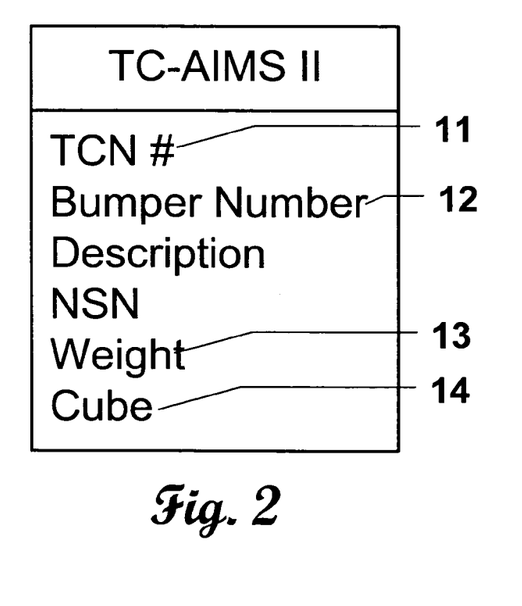
FIG. 2 is a data structure abstraction from TC-AIMS-II.

For simplicity and clarity, FIG. 2 will be used when referencing the data flows from TC-AIMS II. It is recognized that the database structure for the TC-AIMS II is more complex.

Figure 3:
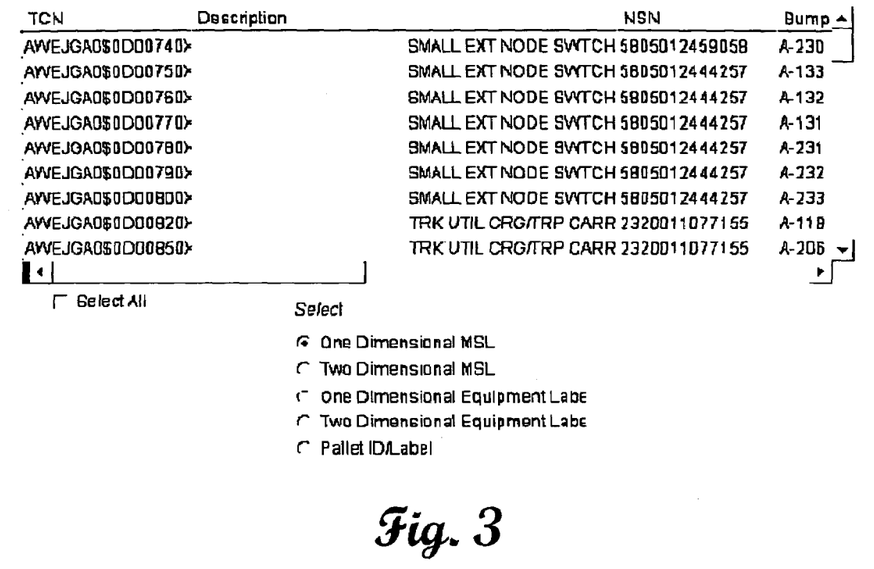
FIG. 3 is a screenshot of the TC-AIMS-II military shipping label routine.
Figure 4:
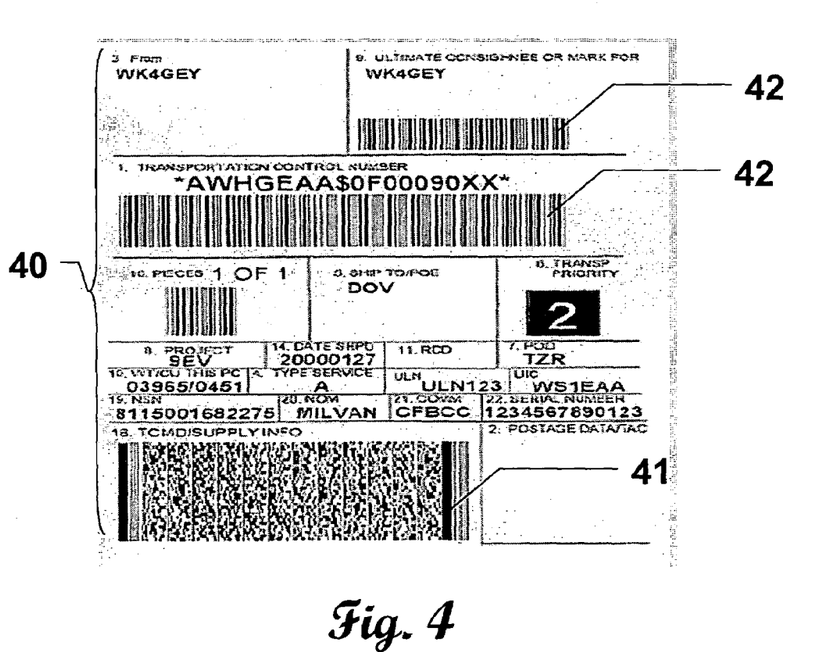
FIG. 4 is a sample military shipping label.

The key to the identification of the vehicle is to utilize the authoritative source. TC-AIMS II is this source. Once the deployment is identified, a Transportation Control Number (TCN) can be generated. This will uniquely identify the Bumper Number with a "mission". FIG. 3 illustrates the TC-AIMS-II system generation of the Military Shipping Label (MSL). FIG. 4 illustrates the end result in the form of a Military Shipping Label 40. Key information is contained in the MSL in the form of 2D Barcode 41, 1D Barcode 42, and Man-Readable format.

Radio frequency (RF) tags are an element of a suite of technologies that enables the automatic capture of source data enabling the ability to document, identify, track, and control deploying forces, equipment, and sustainment cargo. There are three types of Savi (commercial manufacturer) tags (SEAL and Models 410 and 412) currently in use by the Army. The Transportation Coordinator's Automated Command and Control Information System (TC-ACCIS) is the system now used to generate the data to write tags in Total Asset Visibility Intransit Processing Station (TIPS). The Transportation Coordinators' Automated Information Movements System II (TC-AIMS II), the projected replacement for TC ACCIS, and the Deployment Sustainment and Support Tool (DS2T) also currently generate the data required to write tags and labels.

During evaluation test of three weighing techniques, (Static Scales, Portable Scales, and WIM-II) RFID tags generated from TC-AIMS II were applied to the test vehicles to demonstrate, as an additional test, the use of RFID tags on vehicles. FIG. 5 shows representative placement of the RFID tags 51. The RFID tags also have a Military Shipping Label 40 attached to them. This will result in the ability to read unique vehicle identification information in a degraded mode, if necessary.

Software that conforms to the TC-AIMS II standard for writing Military Shipping Labels combined with Zebra PT-700 wireless portable printer provides the ability to print labels. The Symbol PDT8146 mobile interrogator outfitted with a Savi SMR650P RFID pod gives the user the ability to read and write RF tags. Scanning and wireless interface is provided by a Hand held interrogator 61, representatively shown in an operational setting in FIG. 6.

Figure 7:
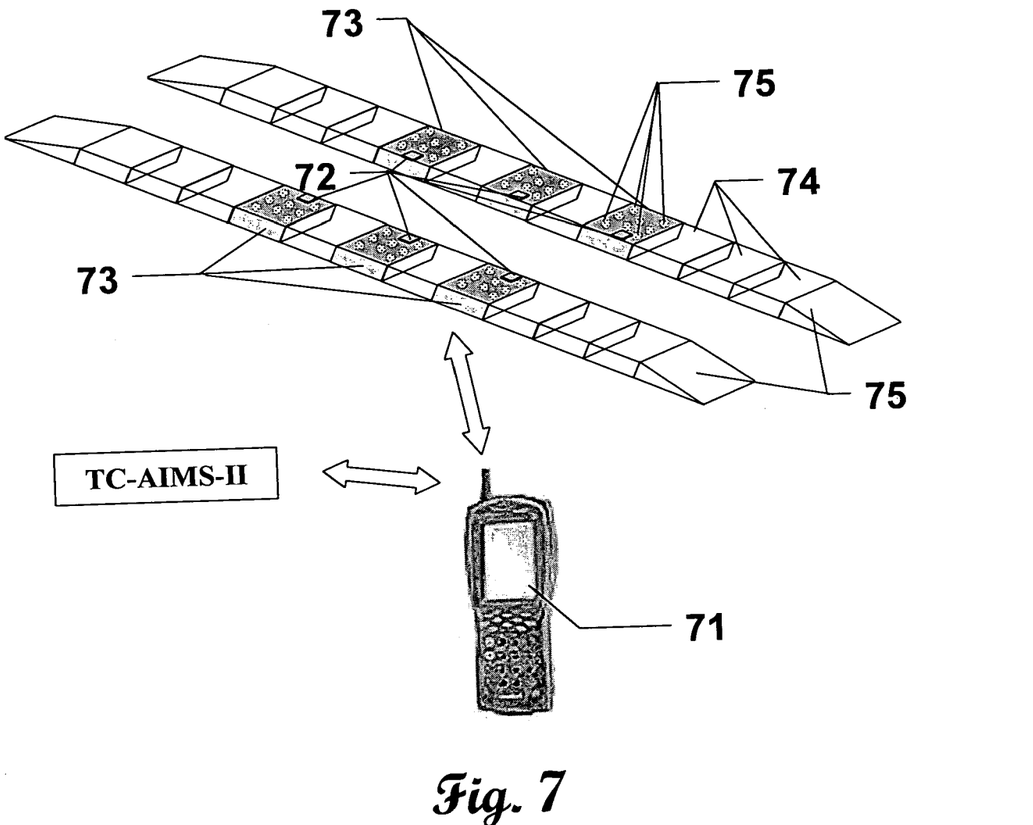
FIG. 7 is a schematic showing the WIM-II pads having wireless communication with a hand-held controller that communicates wireless with AALPS and TC-AIMS-II.

Once the unique vehicle identification and equipment characteristics' data generated from TC-AIMS II/AALPS has been transmitted electronically in the standard TC-AIMS II/AALPS Interface Deployment Equipment List (DEL) format to the WIM-II host computer 71 and the actual weigh and measurement data have been calculated by the WIM-II host computer 71, the dataset information is stored on the WIM-II host computer 71 and is ready to be transmitted. This data will be transmitted to either TC-AIMS II and/or AALPS, and the respective system will import "actual" weights and measurement parameters into their appropriate file structure.

The WIM-II system incorporates preprocessing into each WIM-II pad to minimize the cabling between the system components. Distributed processing eliminates the need for a central computer to perform all of the calculations.

Figure 8:
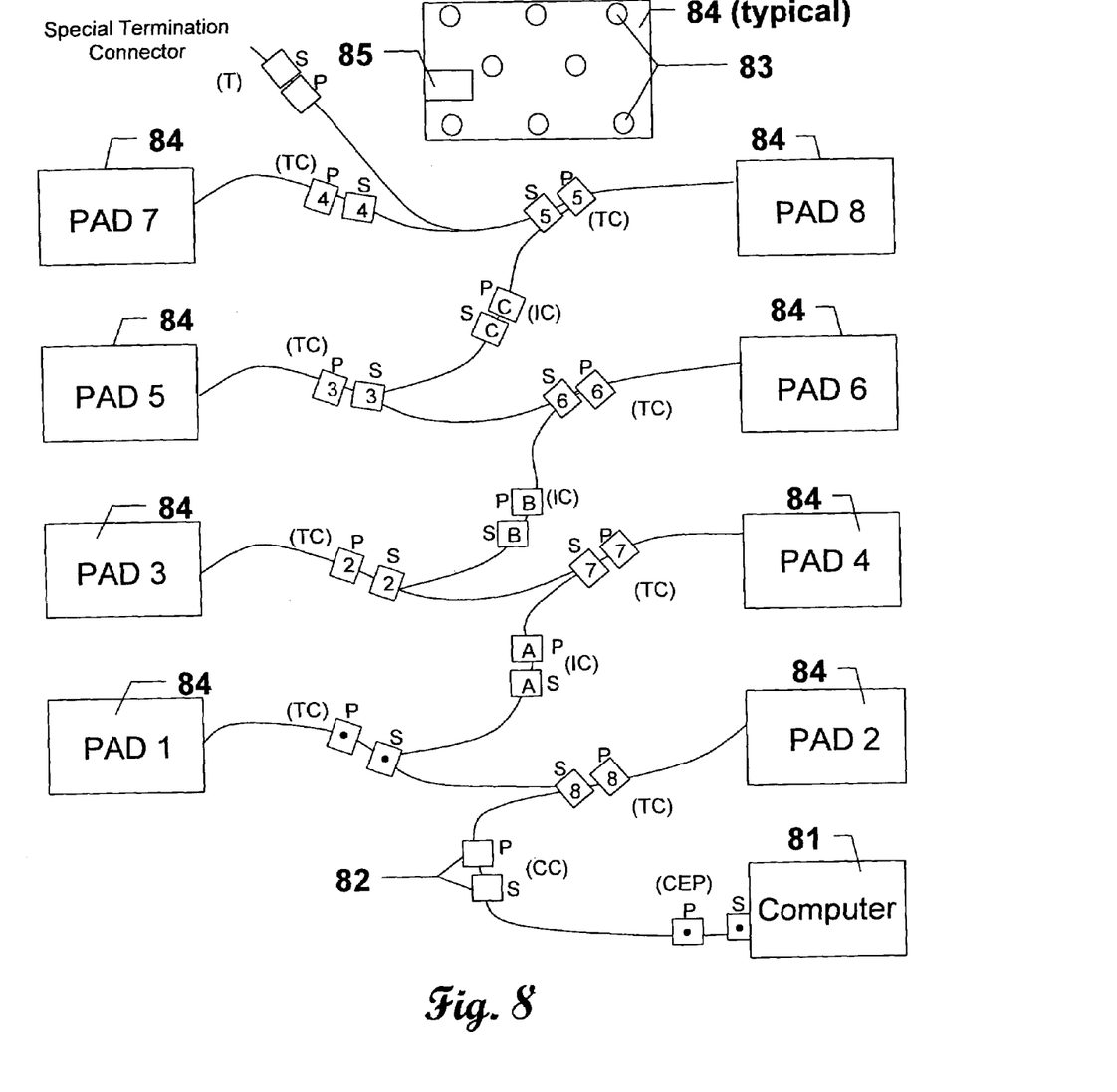
FIG. 8 is a component layout of a WIM-II system having 8 pads.

FIG. 8 shows a typical WIM-II layout where a host computer 81, handheld unit, or data management system can be connected for graphical display if desired. Use of controller area network (CAN) interface connections 82 reduces the total wire count to four wire pairs daisy chained between any number of pads and the main system—five wires for power and three for communication and control. The CAN bus is a high noise immunity communication protocol used widely in the automotive industry and has a proven track record in most US and foreign manufactured cars since the 1990's.

A microcomputer 72 (uC) is incorporated into each transducer pad 73 to preprocess the data from the individual sensors to the resultant tire weight, speed, and time on pad center, along with other supportive information. This microcomputer 72 can be of any make or model that can support the computational speed and interrupt response time.

Currently a Motorola MC9S12DG256C is being used as the microcomputer 72. It supports a CAN interface, serial I/O, parallel I/O, Analog input, 256 Kbytes of Flash program memory, and 12 Kbytes of Ram, among a number of other features that are not used in this application. It can be internally clocked up to 50 MHz. This chip provides all these features on a single inexpensive integrated circuit. Other uC's such as the Rabbit & PIC RISC don't have all the features in one chip, are more expensive, and don't provide the processing power necessary.

Each pad 84, shown in FIG. 8, currently has a total of eight weight sensors 83: three across the leading edge, three across the trailing edge, and the remaining two in the centers of each half of the pad. There is no magic number in using eight sensors. More or fewer sensors may be incorporated into this schema as long as they meet the loading requirements of the pad and are distributed in a way to determine the moment of the loading on the pad. By summing the sensors in the appropriate groupings, the moment of the weight is calculated in the direction of travel. Also the lateral position can also be determined in a similar manner. The tire position and hence speed of the tire is then calculated without using switches. Each pad 84 will then compute and transmit the weight of the axle, its speed, and the time the axle was centered on the pad along with it's ID number for identification.

If a vehicle is traveling at 6 mph [~100"/sec] then the tire will be on the pad less than a half second. Since most tire footprints range from 6" to 1' the effective length of the pad is 2'-1'=1', which equates to about 120 milliseconds of measurement time which requires a digitizing rate of at least ~1 KHz for sufficient accuracy.

While this computation is fairly straight forward, it requires just under a hundred integer math operations for each data point accumulation. With the desired data collection rate of about 1 KHz, the above accumulations need to be performed in less than 1 millisecond (ms). The test program took about 2 ms for the PIC and 0.3 ms for the Rabbit and runs on the Motorola uC in 0.1 ms. The final version with all the supportive calculations necessary for error checking runs on the Motorola in ~0.3 ms. Therefore the other two processors do not have sufficient computational power for this application.

There are a number of tradeoffs in actual operation to determine the best arrangement of the pads. If the pads are placed adjacent to each other in direction of travel such that the tire rolling off one pad is rolling onto the next, then this transition time can be included in the moment calculations, which will add an additional two feet for speed determination with each adjacent pad. This will provide increased accuracy for axle spacing and center-of-balance (COB) calculations but reduced accuracy on overall weight because of its shorter sampling period within the 3 Hz vehicle vertical motion of the suspension. However, spacing the pads over a longer distance will spread out the sampled points on the 3 Hz vertical motion of most vehicle suspensions and improve weighing accuracy.

The pad pairs are preferably adjacent to each other [side to side] rather than staggered for greatest weight accuracy, as most vehicles tend to rock slightly from side to side. Having the sensors weighing both sides at the same time will cancel this effect.

The displays on laptop or notebook computers can be difficult to see outside in the sunlight. An industrial handheld personal digital assistant (PDA) for displaying is used in outdoor environments and with good success except in direct sunlight. Any shading from direct sunlight enhances readability. This embodiment uses a Symbol handheld computer commonly in use today by the military with a backlit LCD display which is viewable in most all lighting conditions.

Weight data are measured as each wheel rolls over the system, which uses two to eight transducer pads. By using the front wheels as a trip indicator and the last wheel to end the cycle, the system can collect and calculate the parameters automatically.

All calculations are completed electronically in real time. The data can be relayed to the military's databases for deployment decision making, such as the Transportation Coordinators' Automated Information for Movement System II (TC-AIMS II) or the Automated Air Load Planning System (AALPS).

The WIM-II system consists of very low profile weight sensors on the ground laid out along the direction of travel for the vehicle to be weighed. Each of these sensors consists of multiple load cells arranged along the edges and possibly the centers of the weighing pad. From this arrangement we can calculate not only the total weight of the load on a pad but also the center of mass of the load by calculating the moment of the various load cells.

This enables tracking, in time, the motion of the tire over the weighing pad thereby determining: 1) the time the load (tire) is over the exact center of the pad [giving a precise position in time], 2) the speed of the tire traveling over the pad, and 3) the lateral position of the tire on the pad. With this information for each pad (and each axle), an array of times that tires have a known position and the speed is generated. The unknowns remaining are the speed profile of the vehicle and the axle spacing.

Given that the vehicle has substantial mass we can assume that the change in acceleration will have small derivatives. Therefore we can assume that the position can be approximated well with a polynomial of a somewhat low order. For a position polynomial of order five, we assume that the change in acceleration can be well represented by a second order polynomial. Experience shows this to be a good approximation even for long vehicles. The actual order of the polynomial used is determine by the number of pads in the system and the number of axles on the vehicle and is adjusted for each vehicle. For example, single pad pair systems weighing vehicles of two axles will only produce two independent points in time of speed and position information. Therefore, a lower order polynomial of three is the maximum that can be used practically when you include the speed and only a second order polynomial when you do not. At the other extreme a five axle truck with a four pad pair system will easily allow a seventh order polynomial with room to spare. Higher orders are not typically useful.

Since longer vehicles take longer to traverse the pad system they can vary more in their speed during that time period. Fortunately longer vehicles tend to have more axles and, hence, more data points. So the greater speed variation typical of these longer vehicles is easily accounted for.

The weighing pads are interlocked with spacers, so the distances between pads are well known. However, the left and right pad systems are independent of each other and while they should be laid out to be directly across from each other, they can have a skew between them. This skew is another factor that is considered unknown and is determined from the consistency of the data.

A very good assumption is that the tires on both sides of the vehicle (connected by a fixed axle) are directly across from each other and can assume to have the same position in the direction of travel at all times. Now the calculation of the axle spacing, the vehicle position polynomial coefficients, and the skew all affect each other in the final determination. Therefore, they must all be calculated together for the best (and most efficient) results.

Hardware and Testing

The weight pads 84, manufactured by Intercomp, Inc., consist of a flat sheet of aluminum about 1¼" thick, 2' in the direction of travel and 4' across. They have eight sensors. 83 distributed over the pad. Three across the leading edge 1½" in from the edge, three across the trailing edge 1½" in from the edge and 2 in the center of each half of the scale. However, any weighing pad with distributed weight sensors of sufficient accuracy can be used.

Since any weight applied to the pad is distributed in some fashion over the pad, the force is divided up among the weight sensors according to the terrain under the pad. In any case the average location of the weight on the pad can be calculated by the method of moments.

This information is important to the overall vehicle calculation. By knowing the relative locations of the weight sensors and the speed the vehicle was traveling at this instant, a reasonable speed profile can be determined which allows calculation of the axle spacing and the center-of-balance with maximum accuracy. Experience has proven to date that using this method speeds can be determined to +/−0.03 mph.

Since the axle spacing affects the speed profile calculation and vise versa, the calculation is carried out in a single large least-squares-fit, simultaneously determining all parameters of interest with the most accuracy available from the data.

Calculations

In this approach we use the least-squares method for calculating all the unknowns at the same time. Axle spacing on a vehicle is represented by an array Ax[j] of positions of the axles from an arbitrary point for each axle j. Pad positions are represented by an array Pd[i] of their positions in the direction of travel, while the skew of the right side (referenced to the left side) is represented by the variable Sq. Here we represent the side of the vehicle with index k: with k=0 being the left side and k=1 being the right side. The vehicle position is represented by the polynomial of order m, $P_m(a_n, t_{ijk})$ where the $a_n$ are the coefficients to the powers of $t^n$ and the subscripts i, j, k on t are for the time when the tire is on pad i for axle j on side k. We then represent the position of the vehicle in time with:

$$X(t_{i,j,k}) = Ax[j] + Pd[i] + k*Sq \approx P_m(a_n, t_{i,j,k}) = \sum_{n=0}^{m} a_n t_{i,j,k}^n$$

therefore, the vehicle speed is:

$$S(t_{i,j,k}) = \frac{\partial}{\partial t} X(t) = \frac{\partial}{\partial t} P_m(a_n, t_{i,j,k}) = P'_{m-1}(a_n/n, t_{i,j,k})$$

Now the least-squares method requires:

$$\sum_{i,j,k} \{P_m(a_n, t_{i,j,k}) - X(t_{i,j,k})\}^2 = \min$$

for position, and for speed we have:

$$\frac{\partial}{\partial a_n} \sum_{i,j,k} \{P'_{m-1}(a_n/n, t_{i,j,k}) - S(t_{i,j,k})\}^2 = 0$$

To find the unknowns we need to differentiate with respect to each of them and set the result to zero. For the position information we have:

$$\frac{\partial}{\partial Ax_j} \sum_{i,j,k} \{P_m(a_n, t_{i,j,k}) - X(t_{i,j,k})\}^2 = 0$$

$$\frac{\partial}{\partial Aa_n} \sum_{i,j,k} \{P_m(a_n, t_{i,j,k}) - X(t_{i,j,k})\}^2 = 0$$

$$\frac{\partial}{\partial Sq} \sum_{i,j,k} \{P_m(a_n, t_{i,j,k}) - X(t_{i,j,k})\}^2 = 0$$

and the speed terms need to be handled separately because the units are different from the above position equations.

$$\frac{\partial}{\partial a_n} \sum_{i,j,k} \{P'_{m-1}(a_n/n, t_{i,j,k}) - S(t_{i,j,k})\}^2 = 0$$

Notice in the position set of equations we have j [# of Axles] equations for the first, m+1 equations for the polynomial coefficients if one includes the $a_0$ coefficient and one equation for the skew Sq. If we look closely at the polynomial, the $a_0$ coefficient is redundant with one of the Axle positions. That is if we do not set the $a_0$ coefficient to zero then the set of equations will be over defined which will lead to an infinite set of answers. We can write the equations in matrix form to solve for an example of a third order polynomial with two axles:

$$\sum_{i,j,k} \begin{bmatrix} t^6 & t^5 & t^4 & t^3\delta_{j,0} & t^3\delta_{j,1} & t^3\delta_{k,1} \\ t^5 & t^4 & t^3 & t^2\delta_{j,0} & t^2\delta_{j,1} & t^2\delta_{k,1} \\ t^4 & t^3 & t^2 & t\delta_{j,0} & t\delta_{j,1} & t\delta_{k,1} \\ t^3\delta_{j,0} & t^2\delta_{j,0} & t\delta_{j,0} & \delta_{j,0} & 0 & \delta_{j,0}\delta_{k,1} \\ t^3\delta_{j,1} & t^2\delta_{j,1} & t\delta_{j,1} & 0 & \delta_{j,1} & \delta_{j,1}\delta_{k,1} \\ t^3\delta_{k,1} & t^2\delta_{k,1} & t\delta_{k,1} & \delta_{j,0}\delta_{k,1} & \delta_{j,1}\delta_{k,1} & \delta_{k,1} \end{bmatrix} * \begin{bmatrix} a_3 \\ a_2 \\ a_1 \\ Ax_0 \\ Ax_1 \\ Sq \end{bmatrix} = \begin{bmatrix} Pd_i * t^3 \\ Pd_i * t^2 \\ Pd_i * t \\ Pd_i * \delta_{j,0} \\ Pd_i * \delta_{j,1} \\ Pd_i * \delta_{k,1} \end{bmatrix}$$

Where all the terms are individual summations over all points $t_{i,j,k}$ shown as a global summation and $t=t_{i,j,k}$ above for simplicity. Note that terms containing $\delta_{j,k}$ indicate that the terms are summed only for those terms where the $\delta_{j,k}$ is 1 where j=k. Note when the term is just $\delta_{j,k}$ by itself, then that term is just the count of the number of points where j=k in this example. To go to higher orders of polynomials or more axles, the expansion pattern can be readily seen above.

For the speed matrix we have $$\sum_{i,j,k} \begin{bmatrix} 3t^4 & 2t^3 & t^2 \\ 3t^3 & 2t^2 & t \\ 3t^2 & 2t & N \end{bmatrix} * \begin{bmatrix} a_3 \\ a_2 \\ a_1 \end{bmatrix} = \begin{bmatrix} Sp_{i,j,k}*t^2 \\ Sp_{i,j,k}*t \\ Sp_{i,j,k} \end{bmatrix}$$

where N is the number of points used in the summations and $Sp_{i,j,k}$ is the speed measurement at time $t=t_{i,j,k}$.

Note that the Position matrix is symmetric but the speed matrix is not. This is because we keep the same coefficients as the position matrix but here we are using the derivative of the polynomial. Also note that the speed matrix is not of function of the axle spacing or the skew, just the polynomial coefficients for the speed profile.

In order to minimize both of these together we need to add them together with some weighting factor. The Speed matrix would of course have to be expanded out with zeros to match the dimension of the position matrix. Remember the position matrix is in the units of distance while the speed matrix is in the units of distance/time. Therefore if we multiply the speed matrix first by a time weighting factor then they will contain the same units and can be added without complications. A convenient time weighting to use for this is $$\sum_{i,j,k} t_{i,j,k}$$

which scales the relative magnitude of the terms to make the speed matrix have approximately equal weighting with the position matrix when it comes to determining the unknowns $a_n$ and of course has no effect on the axle spacing or skew.

An alternate method would be to normalize each row (by its first element) of each system thereby removing all units of dimension. This has not been done in this approach but is stated here for completeness.

Once this matrix is defined, a simple forward elimination backward substitution can be performed for the unknowns. From the speed polynomial obtained, the speed range, maximum acceleration, and maximum variation in acceleration are also calculated to return to the calling program to indicate the "goodness of behavior" of the driver.

One should note that the axle spacing is referenced to a point that forces the $a_0$ polynomial coefficient to zero. Therefore all axle spacings should have the distance of the first axle subtracted before returning to the calling program to remove this arbitrary reference point created by setting $a_0=0$.

Also note that if there are not enough data points to support the higher orders of polynomial for a given run, then the matrix will be singular and the program then automatically reduces the polynomial order by one and tries to re-solve the system. This process continues until valid results are obtained or the polynomial goes below first order, which then declares the run a failure.

Using double precision with axle counts from two to nine, and numbers of pads from one to nine pairs, we can calculate using exact data to better than 0.01" for any axle spacing. Results for real data have shown ideal fits to better than 0.02" when the vehicle is well behaved. If the driver is greatly accelerating then single pad systems with two axle vehicles can vary up to almost an inch in variation. This is still well within the precision desired.

Also noted was a smoothing of the polynomial fit at the ends. Usually when a polynomial is fit to data, the polynomial at the ends of the data range tend to diverge rapidly. In our case when we fit just the position data, this was obvious—not a problem of significance but large enough to be observable. Adding in the speed data appeared to clean up this anomaly and produced a much more pleasing fit to the data over the entire range. Another approach to "clean up the fit" would be to give greater weighting the first and last data points.

For a system that provides both position and speed data points in time we can accurately calculate not only the axle spacing, but also the vehicles' speed profile, and the skew in the weighing pads.

System Description

The WIM-II system shown in FIGS. 7 and 8 comprises:
a) Sets of transducer pads 73 & 84 (1 or more pairs) each with individual sensors 75 & 83 located within the transducer pads 73 & 84 such that it allows a means of measuring the weight moment of the tire(s) as it rolls over the transducer pads (has sufficient response time) as well as being capable of providing a static weight for the tire(s) providing the tire is stationary on the transducer,
b) Pad microcomputer 72 & 85 bus structure onboard each individual transducer for distributed intelligence and interchangeability of pads which provides tire weight, time of tire on pad center, and speed of tire over pad center,
c) A daisy chain connection between each of the transducers to provide power and transmit accumulated data,
d) A host microcomputer 81 to collect the data from the individual transducers, identify the individual transducers, determine their relative positions, and determine the attributes of interest (individual tire(s) weights, individual axle weights, axle spacing, speed profile and longitudinal and transverse center of balance)
e) A industrial handheld PDA 71 (used in this invention—Symbol PDT 8146) outfitted with a Savi SMR650 RFID Pod, and a Zebra Wireless Printer and standard Microsoft Pocket PC operating system to:
  Identify cargo to be weighed via RFID, 2D barcode, 1D barcode or manual entry,
  Receive DEL from TC-AIMS II/AALPS
  Control the WIM device proper,
    Record WIM "actual" weights and measurement information, and
  Transmit this information in the updated DEL to TC-AIMS II/AALPS.
f) Leveling pads 74 to allow vehicle to be level as it passes over the transducers for the in motion weighing,
g) Entrance and exit ramps 75 to provide a smooth transition from ground level to the transducer height for the in motion weighing. Truck suspensions have a typical suspension constant of ~10,000 lbs/inch. That translates to 1000 lbs for a rise of just a tenth of an inch. Also typical truck suspensions have a resonant frequency of around 3 Hz. Therefore it is important to not excite either of these as the vehicle rolls over the system as they could produce significant errors irrespective of the accuracy of the weighing system. Having long smooth leveling pads on both entrance and exit are important for accurate weighing.

FIG. 8 shows a typical arrangement of the components of the WIM-II system. A single extension cable from the Host computer to the center of the pads will provide connection of all the pads to the computer and supply power. Then for each pad pair an extension cable will connect these additional two pads to the system and will have a terminating end "cap" that will contain a connecting terminating resistor for the CAN bus as well as seal the connector from the environment. If another pad pair is added to the system then this cap is removed (along with the terminating resistor connection) to attach the next cable extension for the next two pads. Therefore any pad system will have only one terminating resistor connected at the very end of the cable and all other connectors will be connected to other cables.

The system will be such that the Host microcomputer 81 will recognize the number of pairs of transducer pads 84 (typically 1-4 but can be any number) and the direction of vehicle travel, along with the position of each pad in the system from the data provided by a vehicle rolling over the system. It will then apply the appropriate algorithms to provide the best overall accuracy for the particular configuration.

Each individual transducer pad 84 will have a unique ID number with an onboard pad microcomputer 85 which will sum the individual sensors in a manner, which allows the moment of the of the tire(s) weight to be calculated accurately. This will allow not only the tire(s) position but also the speed to be determined without using switches as in our previous design. Each pad would then transmit the weight of the tire(s), its speed, the time the axle is centered on the pad, and the ID number of the pad to the host microcomputer 81 for overall vehicle analysis of the total vehicle weight, axle spacing, individual tire(s) weight, speed profile, and the longitudinal and lateral center of balance.

Unique features of the WIM-II include:

a) The pads can be assembled in any order and with any number of pairs. The daisy chain connection will link them together in a network. This cable will force the pads to be laid out with the connection side toward the center, thus orienting the pad in the desired direction. A single cable set will be used to connect the network of transducers to the power supply/host computer.

b) Since the pads are oriented correctly by nature of the cable, one can determine left from right side by the direction of the tire rolling over the pad. Positive direction (speed) indicates left side, while negative direction indicates the right side.

c) The order of the pads in the direction of travel is easily sorted out by looking at the time of the first axle on each pad.

d) Users can drive over the system in either direction.

e) By monitoring the individual weight sensors on each pad, the Pad uC system calculates the moment of the tire rolling over as well as the total weight of the tire. From this information, the system determines when the tire is over the center of the pad for precise location information.

f) The system accurately determines the vehicle speed with direction of travel indicated by the sign of the speed. (Negative speed for right side)

g) The number of pad pairs is unlimited. The more pairs used, the greater the accuracy obtainable. Results indicate that overall accuracy is much greater than expected from pure statistical averaging. This is due to the coupling of the weight measurements in a single weighing process of multiple sensors.

h) Distributed intelligence allows mix and match of pads. Pads can be shared amongst many systems and are individually calibrated. The host processor is also easily interchangeable between systems.

i) Pads are capable of static weighing so tongue weights and shipping crates can also be weighed.

j) System is mix and match for number of pad pairs and number of axles on a vehicle.

k) Easy and simple setup and transportability with a single cable connection between all components.

l) Able to transmit digital data directly to load planners and other data banks via email, wireless satellite link, or any other electronic means available.

m) Simple calibration of pads by loading with a predetermined weight at the sensor positions on the pad. All calculation and retention of calibration is performed within each pad.

n) Pads can be arranged to match the vehicle footprint so highly accurate static weights and center of balance (COB) can be obtained by statically weighing all tires at the same time with vehicle stationary.

o) Tracked vehicles can be weighed by using several pad pairs with a solid support across the top of them for protection. This would be a static weighing and therefore would not produce the COB since there are no axles to reference to. However, the conventional means of running over a raised object for determining the COB of a tracked vehicle would still be incorporated.

p) The system is able to account for tare weights by calculating weight and COB for just the load (crate, tracked vehicle on a lowboy) by itself.

q) The system accurately determines the speed profile of a vehicle.

r) The system can perform all measurements at high speed with reduced accuracy since vehicle dynamics are more unpredictable at these higher speeds.

s) Pads can be constructed of lightweight composites or other plastics for easier transporting.

t) Pads can have variable arrangements and spacing in the direction of travel. They do not need to be directly across from each other.

u) The system can handle tire footprints that are much larger than the pad itself.

Unique Features of AI3M include:

a. Ability to unique identify cargo (vehicle and equipment) characteristics' data generated from TC-AIMS II/AALPS via RFID, 2D barcode, 1D barcode or manual entry.

b. Ability to received unique cargo information that has been transmitted electronically via the standard TC-AIMS II/AALPS Interface Deployment Equipment List (DEL) format to the WIM-II handheld computer c. Ability to control the WIM device proper d. Ability to record the "actual" weigh and measurement data have been calculated by the WIM-II computer, the dataset information is stored on the WIM-II handheld computer and is ready to be transmitted.

e. Ability to transmit datasets to either TC-AIMS II and/or AALPS. The respective system will then import "actual" weights and measurement parameters into their appropriate file structure.

Probable uses of the system include: a) weighing vehicles for load planning, b) prescreening vehicles at weighing stations, c) weighing crates for load planning and storage, d) determining payload (product) on a vehicle, e) treaty verification, f) obtaining initial weight of the vehicle entering the facility and then compare it to the exit weight to verify contents.

The Automated Air Load Planning System (AALPS) is a knowledge-based expert system that assists users in the complex task of planning and execution of aircraft loads for all types of deployments. It has been selected as the aircraft load planning system for the Department of Defense.

AALPS is currently fielded to Army, Air Force, Navy, and Marine Corps units throughout Continental United States (CONUS), US Army, Europe (USAREUR) and US Army, Pacific (USARPAC). AALPS is used by contingency planners and force designers to perform air load planning and execution. This entails the use of preplanned data (estimates) and the use of actual data for both "real-world" and "what-if" scenarios. AALPS is used for estimating airlift requirements (by specific aircraft type and delivery method) producing US Air Force (USAF) certified "flyable" load plans, providing airlift/movement summary data and load reports ranging from a single mission to full-scale division deployments. The USAF adopted AALPS for use as air-planning tool for channel traffic air movement of cargo and passengers.

Functional Modules of AALPS include the Equipment Characteristics File (ECF) which provides the capability to view or print item, component, or union data contained in the ECF database. It also provides the capability to save equipment information in a report. The Equipment List File (ELF) provides the capability to create, edit, view, or delete equipment list files. Equipment is entered into force options and force packages. When planning a mission, these prepared lists are retrieved. Entering standard equipment lists in advance is a timesaver and avoids input errors that can occur during deployment. The Deployment Equipment List (DEL) provides the capability to create, edit, view, import, export, or delete a Deployment Equipment List. Equipment can be added to an existing DEL, either by creating an item or by adding an item from the ECF. DELs can be imported into AALPS from LOGMOD, CMOS, LSS, MDSS II, TC-AIMS II, and TC-ACCIS.

The Automatic Load Planner (ALP) is the airlift estimator module of AALPS. The ALP automatically provides estimates of airlift requirements and develops initial load plans for a given equipment list. It provides a set of commands for building a deployment list and selecting airlift parameters, delivery method, aircraft type, and allowable cabin loads. The ability to prioritize some or all of the cargo and passengers is provided. The ALP loads all cargo and PAX in the deployment list, if they fit on the selected aircraft, and are loadable by the selected delivery method. It considers U.S. military, CRAF, and NATO aircraft dimensional, load bearing, and balancing constraints contained in the aircraft database. This module provides the capability to view, save, and print load summary reports.

The Load Plan Editor (LPE) is the AALPS graphics module. It allows the user to create new deployments and load plans, modify load plans generated by the ALP, and delete load plans. This module provides the capability to modify ALP-generated loads into usable load plans. The LPE also allows the creation, modification, and deletion of templates. The LPE provides the capability to print load, unit, equipment, and movement statistics reports and load plans. The LPE displays an aircraft schematic showing loaded cargo and PAX. This module provides the capability to reposition cargo, add and delete cargo and PAX, modify cargo, enter load plan header information, and check aircraft constraint violations. Load plans created by the AALPS LPE are accepted by AMC for aircraft loadings.

DELs can be imported into AALPS from LOGMOD, CMOS, LSS, MDSS II, TC-AIMS II, and TC-ACCIS. The current scope of this effort is limited to receiving data from TC-AIMS. II/AALPS. In future revisions of this document, the other systems will be reviewed.

The key functional module from AALPS that will be interfaced to with regards to updating is the output from the DEL process (also called the DEL), since the DEL provides the capability to create, edit, view, import, export, or delete a Deployment Equipment List. This is the file that WIM-II actually updates and passes weigh and measurement data to TC-AIMS II and AALPS. The DEL file will be updated during this process with "actual" weight and measurement data. This will result in the load plan being built with "actual" data versus "planned" data as is the case now.

EXAMPLE

This use case describes the data feed process of the DEL from AALPS to WIM II system and updates to AALPS. The use case begins when the client process identifies itself to and is authorized for connection to the AALPS data repository.

Basic Flow
    Client establishes a communication path to the directory where AALPS has placed the DEL file (AALPS Interface Outbox).
    WIM II Client retrieves the DEL File from the AALPS Interface Outbox and places it into the WIM Client WIM inbox.
    WIM II Client read the DEL in and processes the entries to be weighed.
    WIM II Client then instructs WIM Device to activate weighing process.
    WIM II device weighs cargo and performs appropriate calculations.
    WIM II device transmits cargo "actual" weights and measurement data to WIM II Client.
    WIM II Client loops until no more items are weighed.
    WIM II Client packages entries into the DEL file in the WIM II Client Interface Outbox.
    WIM II Client transmits DEL file to AALPS by establishing a communication path to the directory where AALPS is set up to receive the DEL file (AALPS Interface inbox).
    AALPS reads in DEL file from the AALPS Interface inbox.
    AALPS processes DEL and places data into the subsystem databases.
    If process fails, go to alternative flow (next item).
Data Input from PTC-AIMS II to WIM-II
    WIM-II client process identifies itself to PTC-AIMS II Hand held interrogator.
    Established a session with WIM-II Vehicle Data Identification module.
    Is authorized to use it to collect unique vehicle identification information data from the RF tag and MSL.
    Vehicle approaches WIM-II.

PTC-AIMS II Hand held interrogator challenges vehicle RF tag.
Vehicle RF tag responds or fails.
If successful, detailed Unique Vehicle Identification Information is retrieved and process continues.
If not successful, PTC-AIMS II degrades itself to read 2D barcode on MSL and reads.
If not successful, PTC-AIMS II degrades itself to read 1D on MSL and reads.
If not successful, PTC-AIMS II degrades itself to read Man-Readable Unique Vehicle Identification Information and reads.
If not successful, go to Alternative Flow.
WIM-II weighs vehicle.
PTC-AIMS II is reset to read next vehicle.
If no more vehicles, shut down link to WIM-II.
Go to Post Condition.
Alternative Flows
  WIM-II client process copies "actual" weight and measurement data onto floppy disk or some appropriate transfer media in the TC-AIMS II/AALPS Interface format for the DEL file (e.g., CD, solid state memory device, etc.)
  Established a communications session with AALPS on AALPS machine directly.
  Is authorized to put updated "actual" weight and measurement data in AALPS Interface Inbox.
  WIM-II Client copies the updated DEL File ("actual" updated weight and measurement data) into AALPS Interface Inbox.
  AALPS acknowledges receipt.
  If unsuccessful, alert WIM-II system,
    WIM-II client print out all pertinent "actual" weight and measurement data with Unique Vehicle Identification Information.
    Transmits information to AALPS personnel for manual update.
Data Input from TC-AIMS II Generated RFID Tags to WIM-II
  WIM II Client process identifies itself to the WIM II Hand held interrogator.
  Established a session with WIM-II Vehicle Data Identification module.
  Is authorized to use to collect unique vehicle identification information data from the RFID tags.
  WIM II Client scans surrounding area for all available RFID tags on cargo.
  WIM II Client Hand held interrogator challenges vehicle RF tag.
  Vehicle RFID tags respond or fail.
    1. If successful, detailed Unique Vehicle Identification Information (UVII) is retrieved for all cargo in surrounding area, MSL are read in as needed, and information added to UVII list to cross reference with DEL file.
    2. If not successful, WIM II Client will degrade itself to read 2D barcode on MSL.
    3. If not successful, WIM II Client will degrade itself to read 1D on MSL.
    4. If not successful, WIM II Client will degrade itself to read Man-Readable UVII.
    5. If not successful, go to Alternative Flow.
  WIM-II Client goes to first use case to process in DEL file and weighs vehicle/cargo.
  WIM II Client continues until no more vehicles/cargo are to be process and shuts down link to WIM-II device.

Alternative Flows
  The alternative flow for this Use Case is a complete manual over-ride of the system. In the event that the RFID and MSL are absence and the equipment must be weighed, a manual entry to establish the unique identified (TCN or Bumper Number) will be keyed into the WIM-II Client handheld device so the weighing can be accomplished.

While there has been shown and described what are at present considered the preferred embodiments of the invention, it will be obvious to those skilled in the art that various changes and modifications can be made therein without departing from the scope.

We claim:

1. An asset identification and information infrastructure management (AI3M) device comprising,
  a) at least one automated identification technology system (AIT),
  b) at least one Transportation Coordinators' Automated Information for Movements System II (TC-AIMS II),
  c) at least one weigh-in-motion system (WIM-II), further comprising:
    1) at least one set of transducer pads, each pad having at least one transducer group with transducers positioned essentially perpendicular to the direction of travel, each transducer group positioned at a predefined distance from each other in a direction essentially parallel to the direction of travel;
    2) at least one pad microcomputer on each transducer pad, said pad microcomputer using a means for calculating first output signal indicative of weight, second output signal indicative of time, and third output signal indicative of speed;
    3) at least one host microcomputer in electronic communication with each pad microcomputer, said host microcomputer using a means for calculating at least one unknown selected from the group consisting of individual tire weight, individual axle weight, axle spacing, speed profile, longitudinal center of balance, and transverse center of balance;
    4) a network communication system for transferring data between said pad microcomputer and said host microcomputer.
  d) at least one Automated Air Load Planning system (AALPS),
  wherein said AIT is in electronic communication with said TC-AIMS II, said TC-AIMS II is in electronic communication with said AALPS, and said WIM-II is in electronic communication with said AIT, said TC-AIMS II and said AALPS.

2. The AI3M device of claim 1 wherein said means for calculating first output signal indicative of weight, second output signal indicative of time, and third output signal indicative of speed further comprises the method of moments.

3. The AI3M device of claim 1 wherein said means for calculating at least one unknown selected from the group consisting of individual tire weight, individual axle weight, axle spacing, speed profile, longitudinal center of balance, and transverse center of balance further comprises the least squares method.

4. The AI3M device of claim 1 wherein said network communication system is a controller area network.

5. A method of characterizing assets comprising the steps of:
  a) establishing an electronic communication path between automated identification technology system (AIT), Transportation Coordinators' Automated Information for Movements System II (TC-AIMS-II) weigh-in-motion system (WIM-II), and Automated Air Load Planning system (AALPS),
b) identifying an asset with AIT,
c) retrieving planned asset characteristics from TC-AIMS-II,
d) transmitting said planned asset characteristics to WIM-II,
e) measuring actual asset characteristics using WIM-II,
f) transmitting said actual asset characteristics to TC-AIMS-II and AALPS,
g) calculating an actual load plan using AALPS.

6. The method of claim 5 wherein said AIT further comprises,
a) at least one data storage device,
b) at least one hardware device for writing information on said data storage device,
c) at least one data reception device, and
d) at least one communications infrastructure linking said AIT to said TC-AIMS II.

7. The method of claim 6 wherein said data storage device is selected from at least one of the group consisting of bar code label, optical memory card, smart card, and radio frequency (RFID) tag.

8. The method of claim 7 wherein said RFID tag is selected from at least one of the group consisting of active tags and passive tags.

9. The method of claim 5 wherein said TC-AIMS II further comprises an interface to a Global Transportation Network.

10. The method of claim 5 wherein said AIT further comprises a wireless interrogator.

11. The method of claim 5 wherein said AALPS further comprises a means for calculating a load plan.

12. The method of claim 5 wherein said WIM-II further comprises;
a) at least one set of transducer pads, each pad having at least one transducer group with transducers positioned essentially perpendicular to the direction of travel, each transducer group positioned at a pre-defined distance from each other in a direction essentially parallel to the direction of travel;
b) at least one pad microcomputer on each transducer pad, said pad microcomputer using a means for calculating first output signal indicative of weight, second output signal indicative of time, and third output signal indicative of speed;
c) at least one host microcomputer in electronic communication with each pad microcomputer, said host microcomputer using a means for calculating at least one unknown selected from the group consisting of individual tire weight, individual axle weight, axle spacing, speed profile, longitudinal center of balance, and transverse center of balance;
d) a network communication system for transferring data between said pad microcomputer and said host microcomputer.

13. The method of claim 12 wherein said means for calculating first output signal indicative of weight, second output signal indicative of time, and third output signal indicative of speed further comprises the method of moments.

14. The method of claim 12 wherein said means for calculating at least one unknown selected from the group consisting of individual tire weight, individual axle weight, axle spacing, speed profile, longitudinal center of balance, and transverse center of balance further comprises the least squares method.

15. The method of claim 12 wherein said network communication system is a controller area network.

16. An asset identification and information infrastructure management device comprising,
a) at least one automated identification technology system,
b) at least one information management system, and
c) at least one weigh-in-motion system, further comprising;
1) at least one set of transducer pads, each pad having at least one transducer group with transducers positioned perpendicular to the direction of travel, each transducer group positioned at a pre-defined distance from each other in a direction parallel to the direction of travel;
2) at least one pad microcomputer on each transducer pad, said pad microcomputer using a means for calculating first output signal indicative of weight, second output signal indicative of time, and third output signal indicative of speed;
3) at least one host microcomputer in electronic communication with each pad microcomputer, said host microcomputer using a means for calculating at least one unknown selected from the group consisting of individual tire weight, individual axle weight, axle spacing, speed profile, longitudinal center of balance, and transverse center of balance;
4) a network communication system for transferring data between said pad microcomputer and said host microcomputer.
wherein said automated identification technology system is in electronic communication with said information management system and said information management system is in electronic communication with said weigh-in-motion system.

17. The device of claim 16 wherein said means for calculating first output signal indicative of weight, second output signal indicative of time, and third output signal indicative of speed further comprises the method of moments.

18. The device of claim 16 wherein said means for calculating at least one unknown selected from the group consisting of individual tire weight, individual axle weight, axle spacing, speed profile, longitudinal center of balance, and transverse center of balance further comprises the least squares method.

19. The device of claim 16 wherein said network communication system is a controller area network.

* * * * *